United States Patent
Kim et al.

(10) Patent No.: US 10,244,535 B2
(45) Date of Patent: Mar. 26, 2019

(54) METHOD FOR ALLOTTING SYSTEM BANDWIDTH IN WIRELESS ACCESS SYSTEM SUPPORTING MACHINE-TYPE COMMUNICATION AND APPARATUS FOR SUPPORTING SAME

(71) Applicant: LG ELECTRONICS INC., Seoul (KR)

(72) Inventors: Jinmin Kim, Seoul (KR); Kitae Kim, Seoul (KR); Hyunsoo Ko, Seoul (KR); Jaehoon Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 14/767,518

(22) PCT Filed: Feb. 13, 2014

(86) PCT No.: PCT/KR2014/001180
§ 371 (c)(1),
(2) Date: Aug. 12, 2015

(87) PCT Pub. No.: WO2014/126395
PCT Pub. Date: Aug. 21, 2014

(65) Prior Publication Data
US 2016/0007334 A1    Jan. 7, 2016

Related U.S. Application Data

(60) Provisional application No. 61/764,504, filed on Feb. 13, 2013.

(51) Int. Cl.
*H04W 72/04* (2009.01)
*H04W 4/70* (2018.01)

(52) U.S. Cl.
CPC ........... *H04W 72/048* (2013.01); *H04W 4/70* (2018.02); *H04W 72/0453* (2013.01); *H04W 72/0413* (2013.01)

(58) Field of Classification Search
CPC .............. H04W 72/048; H04W 4/005; H04W 72/0453; H04W 72/0413
See application file for complete search history.

(56) References Cited

U.S. PATENT DOCUMENTS 9,042,326 B2 * 5/2015 Lim .................. H04W 72/0413
                                                    370/329
2009/0010219 A1 * 1/2009 Lee ....................... H04W 28/20
                                                    370/329
(Continued)

FOREIGN PATENT DOCUMENTS

KR    10-2010-0026911 A    3/2010
KR    10-2010-0028456 A    3/2010
(Continued)

*Primary Examiner* — Raj Jain
*Assistant Examiner* — Harry H Kim
(74) *Attorney, Agent, or Firm* — Dentons US LLP

(57) ABSTRACT

The present invention is used for a wireless access system supporting a machine type communication (MTC), and provides a method for allotting a new system bandwidth for MTC and an apparatus for supporting the same. According to an embodiment of the present invention, a method for allotting a system bandwidth for an MTC terminal in a wireless access system supporting a machine type communication (MTC) includes the steps of: causing an MTC terminal to receive an upper layer signal containing the system bandwidth indication information representing an MTC system bandwidth allotted to the MTC terminal; and causing the MTC terminal to transmit uplink control information through the MTC system bandwidth represented by the system bandwidth indication information. In this case, the MTC system bandwidth can be constructed by connecting to a legacy system bandwidth in the direction of the frequency axis.

4 Claims, 9 Drawing Sheets

(a)

(b)

(c)

(56) References Cited

U.S. PATENT DOCUMENTS

2010/0260081 A1   10/2010  Damnjanovic et al.
2012/0063373 A1*  3/2012  Chincholi ............... H04L 5/001
                                                                370/281
2013/0301524 A1*  11/2013  Xu ........................ H04W 48/12
                                                                370/328

FOREIGN PATENT DOCUMENTS

WO      2011-162565 A2   12/2011
WO      2012-005494 A2    1/2012

* cited by examiner

FIG. 4
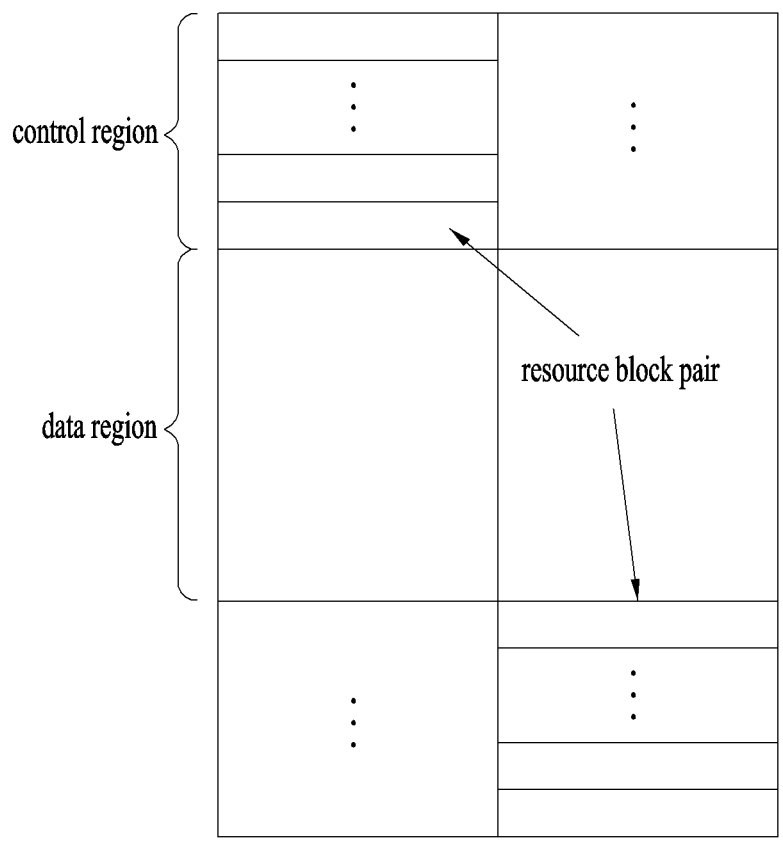
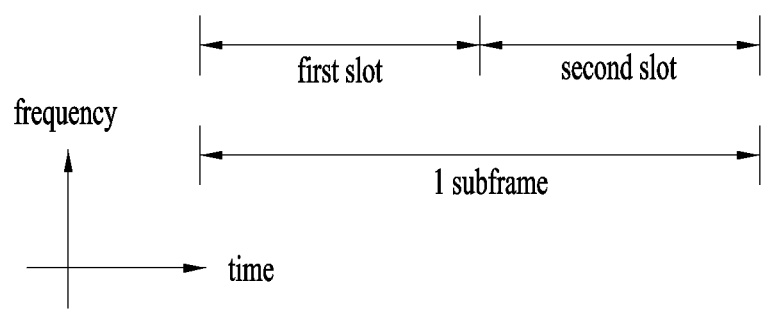

FIG. 8
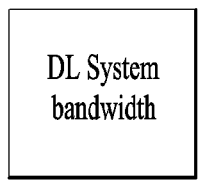
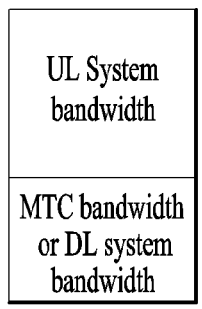
(a)
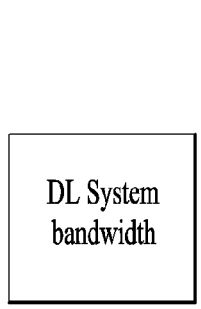
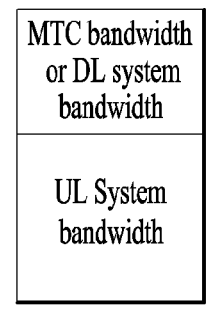
(b)
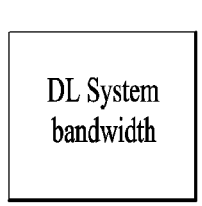
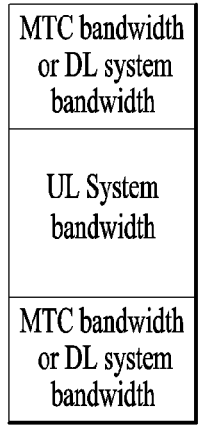
(c)

FIG. 9
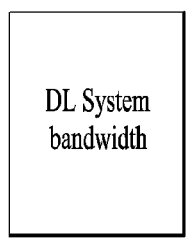 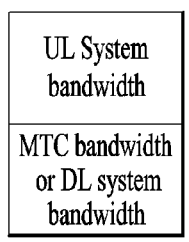
(a)
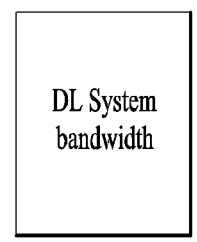 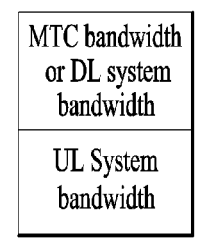
(b)
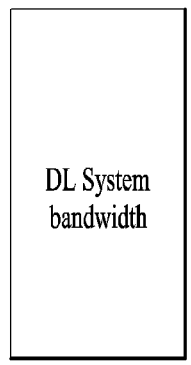 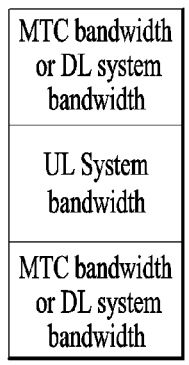
(c)

METHOD FOR ALLOTTING SYSTEM BANDWIDTH IN WIRELESS ACCESS SYSTEM SUPPORTING MACHINE-TYPE COMMUNICATION AND APPARATUS FOR SUPPORTING SAME

This application is a 35 USC § 371 National Stage entry of International Application No. PCT/KR2014/001180 filed on Feb. 13, 2014, which claims priority to U.S. Provisional Application No. 61/764,504, filed on Feb. 13, 2013, all of which are incorporated by reference in their entirety herein.

TECHNICAL FIELD

The present invention relates to a wireless access system supporting MTC (machine type communication), and more particularly, to a method for allocating a new system bandwidth for the MTC and an apparatus therefor.

BACKGROUND ART

In the following, an MTC environment used in the present invention is briefly explained.

MTC corresponds to a concept including D2D (device to device) communication and M2M (machine to machine) communication corresponding to communication between devices. The MTC indicates communication performed between each of terminals (i.e., devices) and a base station or between terminals.

The MTC literally means a communication between one electronic device and another electronic device. In general, the MTC may mean a wire/wireless communication between electronic devices or a communication between a human-controllable device and a machine. Yet, recently, the MTC may specifically indicate a wireless communication performed between electronic devices without a human involvement.

In the early 1990's, in which the concept of a D2D communication, which is a sort of the MTC, has been initially introduced, the D2D communication has been recognized as remote control or telematics or the like and derivative markets of the D2D communication were very limitative. Yet, the D2D communication has grown rapidly for past few years and has become the globally noteworthy markets. Specifically, in POS (point of sales) and security related application markets, the D2D communication has considerably influence on such field as fleet management, remote monitoring of machinery and equipment, smart meter for auto-measurement of operating time, consumed heat or electricity quantity on construction machinery equipment and the like. D2D communication in the future will be further utilized for various usages in connection with a small-scale output communication solution such as conventional mobile communication, wireless high-speed internet, Wi-Fi, ZigBee and the like and may lay the foundation of expansion to B2C (business to consumer) markets instead of being confined to B2B (business to business) markets.

In the era of the D2D communication, every machine equipped with SIM (subscriber identity module) card enables data transmission and reception and is capable of remote management and control. For instance, as D2D communication technology is usable for numerous devices and equipment including vehicles, trucks, trains, containers, auto-vending machines, gas tanks and the like, its application fields may reach far and wide.

Meanwhile, in case that the MTC including the D2D communication is applied to a legacy system (e.g., LTE system), a method of allotting uplink bandwidth to each device has not been proposed in detail yet.

DISCLOSURE OF THE INVENTION

Technical Tasks

The present invention is directed to an apparatus for and method thereof that substantially obviate one or more of the problems due to limitations and disadvantages of the related art. One object of the present invention is to provide various methods for supporting MTC.

Another object of the present invention is to provide a method for allocating a specific uplink bandwidth to each terminal (i.e., device) in MTC.

Another object of the present invention is to provide methods for determining and allocating a radio resource used in MTC and cellular communication in frequency axis.

Another object of the present invention is to provide methods of controlling a downlink/uplink ratio in a TDD system without modifying a legacy TDD configuration.

The other object of the present invention is to provide an apparatus capable of supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention is used in a wireless access system supporting MTC (machine type communication) and provides methods of allotting a new system bandwidth for the MTC and an apparatus therefor.

To achieve these and other advantages and in accordance with the purpose of the present invention, as embodied and broadly described, according to one embodiment, a method for allocating a system bandwidth to an MTC terminal in a wireless access system supporting MTC (machine type communication) includes the steps of receiving an upper layer signal, which is received by the MTC terminal, including system bandwidth indication information indicating an MTC system bandwidth allocated to the MTC terminal and transmitting uplink control information, which is transmitted by the MTC terminal, via the MTC system bandwidth indicated by the system bandwidth indication information. In this case, the MTC system bandwidth can be configured in a manner of being adjacent to a legacy system bandwidth in a frequency axis direction.

To further achieve these and other advantages and in accordance with the purpose of the present invention, according to a different embodiment, a method for allocating a system bandwidth to an MTC terminal, which is allocated by a base station in a wireless access system supporting MTC (machine type communication) includes the steps of transmitting an upper layer signal including system bandwidth indication information indicating an MTC system bandwidth allocated to the MTC terminal and receiving uplink control information via the MTC system bandwidth indicated by the system bandwidth indication information. In this case, the MTC system bandwidth can be configured in a manner of being adjacent to a legacy system bandwidth in a frequency axis direction.

To further achieve these and other advantages and in accordance with the purpose of the present invention, according to a further different embodiment, an MTC terminal to which a system bandwidth is allocated in a wireless access system supporting MTC (machine type communication) can include a transmitter, a receiver and a processor configured to support the MTC, the processor configured to control the receiver to receive an upper layer signal containing system bandwidth indication information indicating an MTC system bandwidth allocated to the MTC terminal, the processor configured to control the transmitter to transmit uplink control information via the MTC system bandwidth indicated by the system bandwidth indication information. In this case, the MTC system bandwidth can be configured in a manner of being adjacent to a legacy system bandwidth in a frequency axis direction.

To further achieve these and other advantages and in accordance with the purpose of the present invention, according to a further different embodiment, a base station configured to allocate a system bandwidth to an MTC terminal in a wireless access system supporting MTC (machine type communication) can include a transmitter, a receiver and a processor configured to support the MTC, the processor configured to control the transmitter to transmit an upper layer signal including system bandwidth indication information indicating an MTC system bandwidth allocated to the MTC terminal, the processor configured to control the receiver to receive uplink control information via the MTC system bandwidth indicated by the system bandwidth indication information. In this case, the MTC system bandwidth can be configured in a manner of being adjacent to a legacy system bandwidth in a frequency axis direction.

In the embodiments of the present invention, the system bandwidth indication information may correspond to bitmap information indicating an absolute value of the MTC system bandwidth.

The system bandwidth indication information may indicate an uplink system bandwidth for the MTC terminal. In this case, the system bandwidth indication information can be configured by a value relative to a downlink system bandwidth.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First of all, a terminal and a base station can use a method for allocating various system bandwidths for supporting MTC.

Secondly, it is able to adaptively allot a specific uplink bandwidth to each terminal in MTC.

Thirdly, it is able to determine and allocate a radio resource used in MTC and cellular communication in frequency axis.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 4 illustrates a structure of an UpLink (UL) subframe, which may be used in embodiments of the present invention;

FIG. 8 illustrates a different example of an MTC bandwidth configured in MTC;

FIG. 9 illustrates a further different example of an MTC bandwidth configured in MTC;

BEST MODE

Mode for Invention

Figure 1:
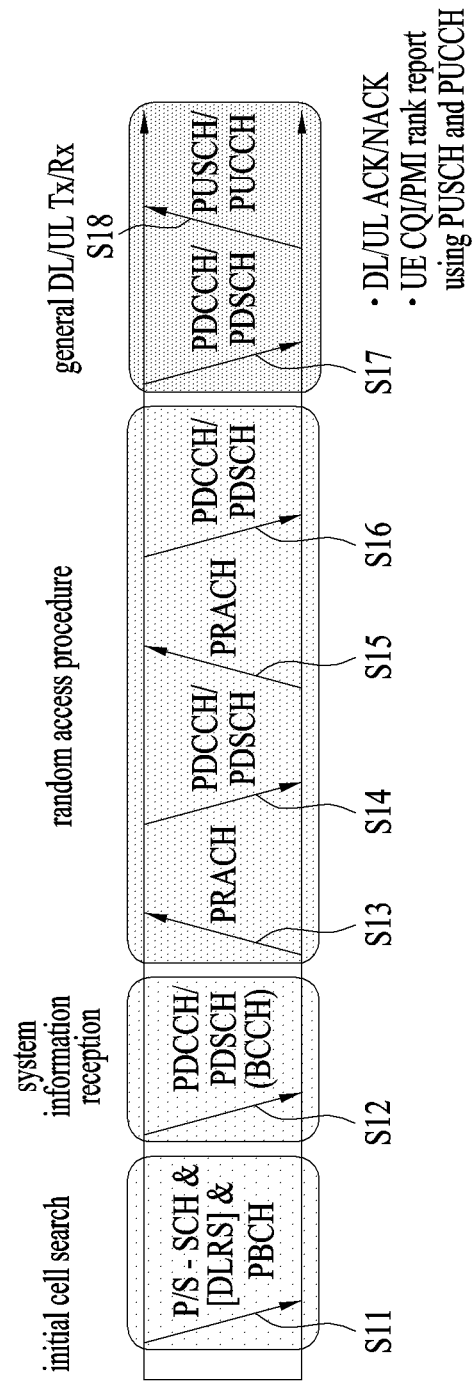
FIG. 1 illustrates physical channels and a general signal transmission method using the physical channels, which may be used in embodiments of the present invention.

The present invention relates to a wireless access system supporting MTC (machine type communication), and more particularly, to a method of allotting a new system bandwidth for the MTC and an apparatus therefor.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided least it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
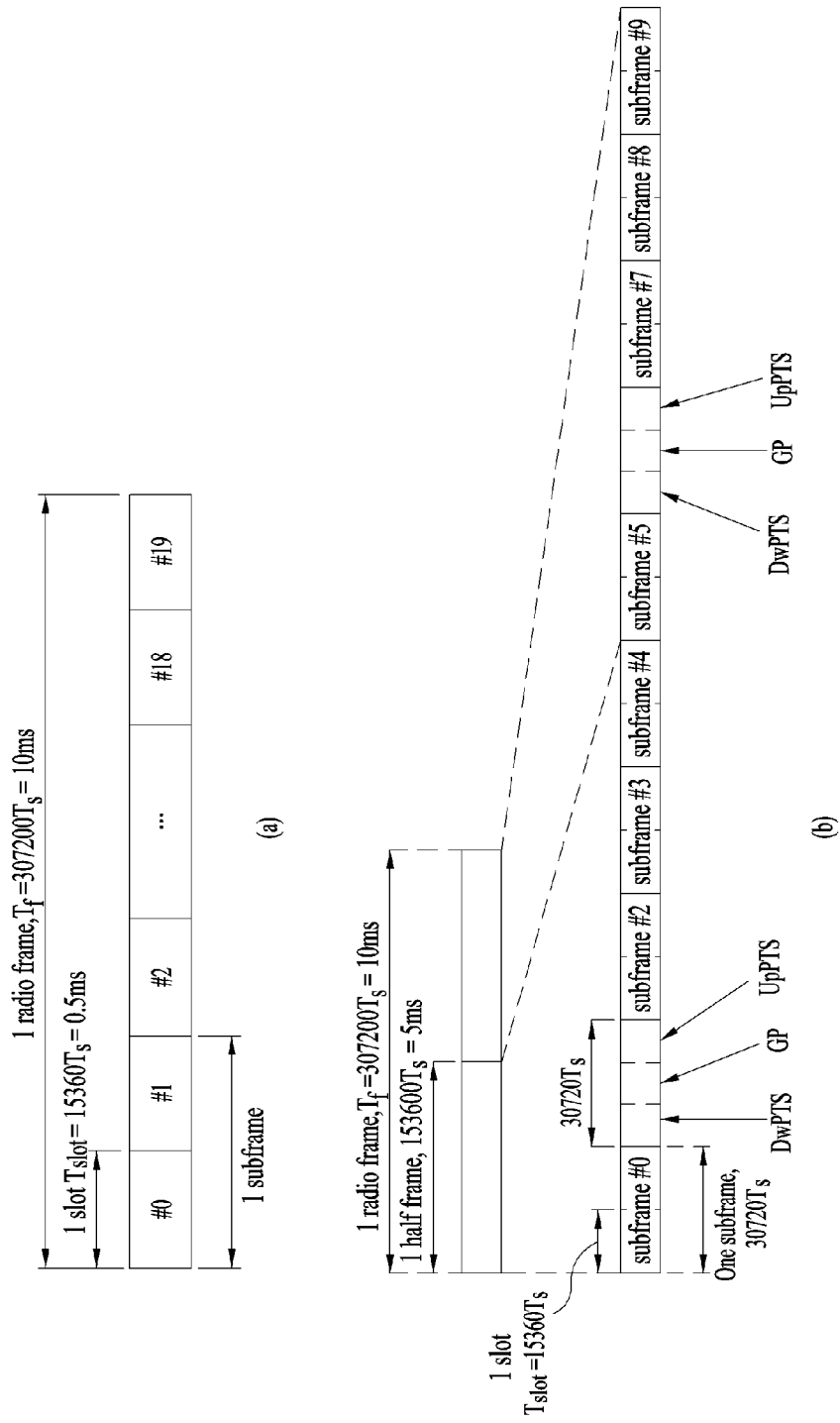
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s$=1/(15 kHz×2048)=3.2552×10$^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
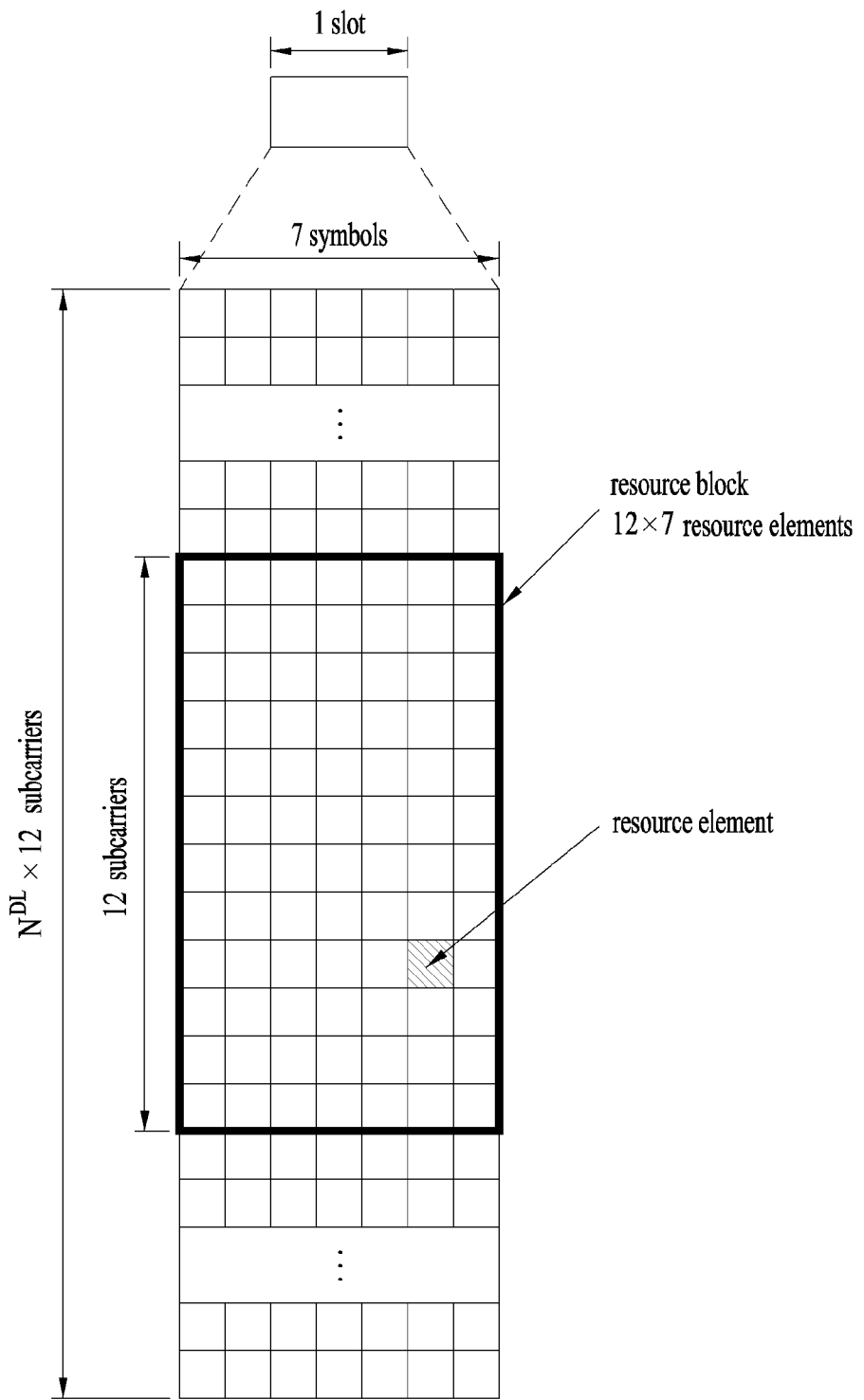
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
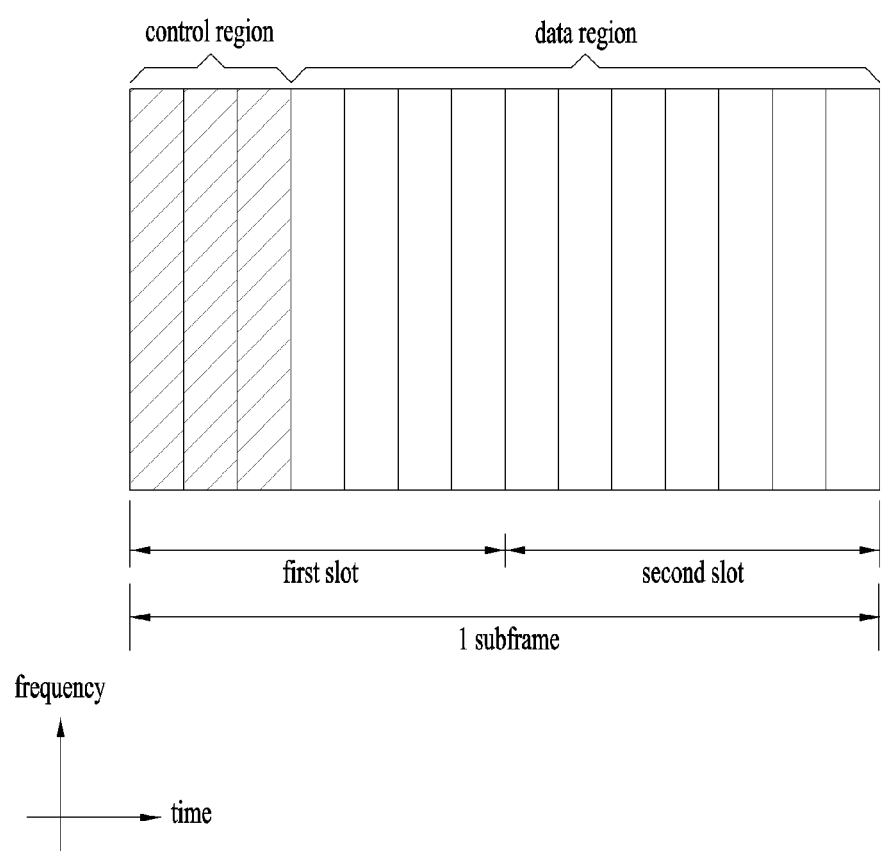
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Generals of Uplink/Downlink Scheduling in TDD System 1.2.1 Uplink-Downlink Configuration in TDD System In a type 2 frame structure (refer to FIG. 2 (*b*)), uplink-downlink configuration corresponds to a rule indicating a rule of allocating (reserving) all subframes in uplink and downlink. Table 2 in the following shows an example of the uplink-downlink configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, according to each subframe of a radio frame, "D" indicates a subframe for downlink transmission, "U" indicates a subframe for uplink transmission and "S" indicates a special subframe configured by 3 fields including a DwPTS, a GP and an UpPTS. The uplink-downlink configuration can be divided into 7 types. A position or the number of a downlink subframe, a special subframe and an uplink subframe vary according to each configuration.

Timing of switching to uplink from downlink or timing of switching to downlink from uplink is called a switching point. A switch-point periodicity indicates a period identically repeating an aspect of switching an uplink subframe and an aspect of switching a downlink subframe and supports both 5 ms and 10 ms. In case of 5 ms downlink-uplink switch-point period, a special subframe (S) exists in every half-frame. In case of 10 ms downlink-uplink switch-point period, the special subframe exists in a first half-frame only.

In all configurations, a $0^{th}$ subframe, a $5^{th}$ subframe and a DwPTS correspond to a section used for downlink transmission only. A subframe immediately adjacent to a UpPTS and a special subframe corresponds to a section used for uplink transmission only.

Both a base station and a terminal are able to know the uplink-downlink configuration as system information. The base station can inform the terminal of a change of uplink-downlink allocation status of a radio frame in a manner of transmitting an index of the configuration information only whenever the uplink-downlink configuration information changes. And, similar to other scheduling information, the configuration information can also be transmitted on a downlink control channel, PDCCH (physical downlink control channel), as a sort of downlink control information and can be commonly transmitted to all terminals via a broadcast channel as broadcast information. In TDD system, the number of half-frames included in a radio frame, the number of subframes included in a half-frame and a combination of a downlink subframe and an uplink subframe are just an example.

1.2.2 Uplink/Downlink Scheduling in TDD System

Since downlink/uplink subframe configuration in TDD system varies according to an uplink-downlink configuration, PUSCH transmission time and PHICH transmission time are differently configured according to the configuration. The PUSCH transmission time and the PHICH transmission time can be differently configured according to an index (or number) of a subframe.

In LTE system, uplink/downlink timing relation of PHICH on which PUSCH, PDCCH preceding the PUSCH and downlink ACK/NACK corresponding to the PUSCH are transmitted is determined in advance.

Table 3 shows transmission timing of PDCCH and transmission timing of PUSCH corresponding to the PDCCH according to uplink-downlink configuration.

TABLE 3

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Referring to Table 3, in case of uplink-downlink configuration 1 to 6, when a UE receives a UL grant from a base station via PDCCH in a downlink subframe n or receives PHICH and retransmits the PHICH, the UE transmits PUSCH in a corresponding subframe n+k according to an index of the subframe in which the PDCCH (or PHICH) is transmitted. In this case, a value of the k is shown in Table 3.

In case of uplink-downlink configuration 0, PUSCH is transmitted according to a value of an uplink (UL) index in an uplink DCI format, number of a downlink subframe in which PHICH is transmitted, or $I_{PHICH}$ value received via upper layer or determined by number of an uplink subframe in which PUSCH is transmitted. Or, the PUSCH can be transmitted in an uplink subframe n+7 or can be transmitted in both an uplink subframe according to Table 3 and the uplink subframe n+7.

2. MTC Environment

Machine type communication (MTC) corresponds to a concept including D2D (device to device) communication and/or M2M (machine to machine) communication and indicates communication performed between a base station and each terminal or communication performed between terminals. In particular, an MTC device is a user equipment (UE) supporting the MTC and the MTC device may refer to a device performing communication with an MTC server and/or different MTC devices via a PLMN (public land mobile network).

The MTC device is able to communicate with such an entity configured to locally (wirelessly, if possible, via a PAN (personal area network or in a hard-wired form) provide and communicate "raw data" as an MTC server and/or other MTC device. In embodiments of the present invention described in the following, "terminal or "device" corresponds to an MTC device unless there is special explanation.

In MTC environment, data can be extensively transmitted in a cell boundary. And, many terminals may exist in the MTC environment. And, due to a characteristic of each terminal (e.g., a refrigerator, a washing machine, a cellular phone, a TV, a notebook and the like), a data transmission period and/or an amount of data can be configured in various forms.

As shown in Table 4 in the following, the characteristic of each terminal can be designed in a manner of being divided into a plurality of categories in terms of implementation of a terminal.

(physical uplink control channel), PUSCH (physical uplink shared channel), an SRS (sounding reference signal) and/or a RACH (random access channel) by a terminal. In the following, a method of indicating a specific uplink system bandwidth to a terminal is explained.

Figure 6:
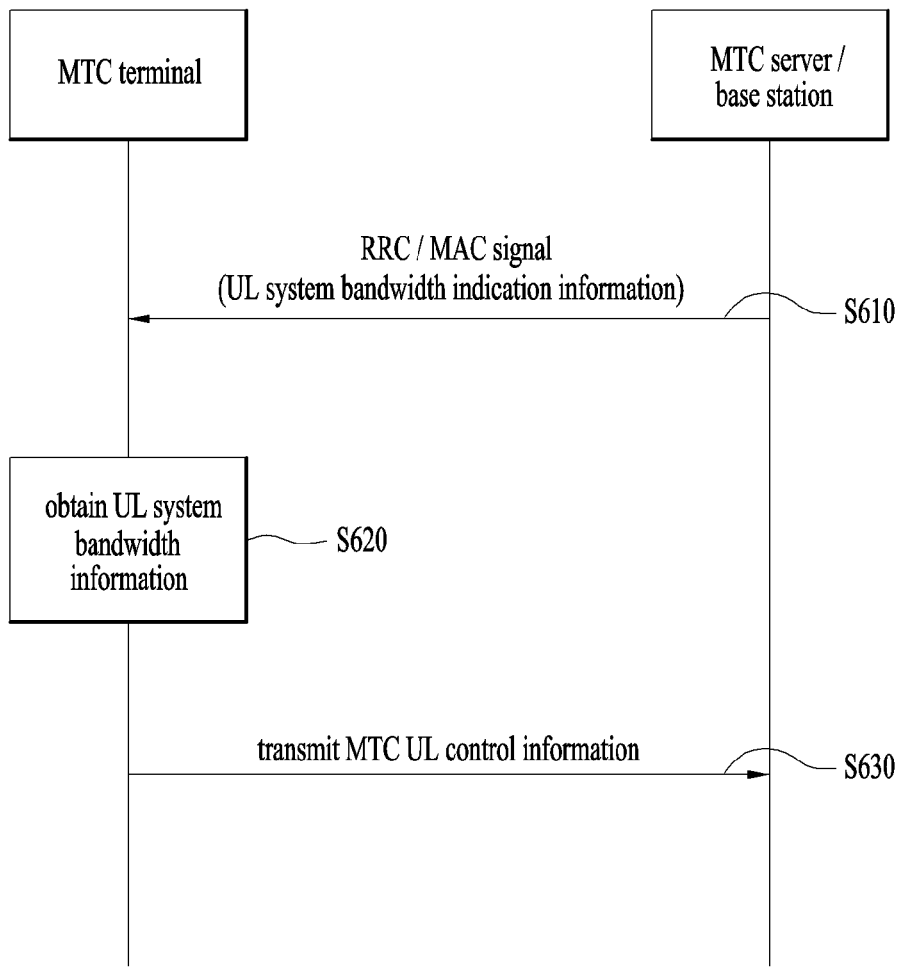
FIG. 6 illustrates one of methods allotting a UE-specific UL system bandwidth to a UE according to embodiment of the present invention.

FIG. 6 illustrates one of methods for allocating a UE-specific UL system bandwidth to a UE according to embodiment of the present invention.

TABLE 4

| UE category | Max. Data rate (DL/UL) (Mbps) | Downlink | | | | Uplink | | |
| --- | --- | --- | --- | --- | --- | --- | --- | --- |
| | | Max. #DL-SCH TB bits/TTI | Max. #DL-SCH bits/TB/TTI | Total soft channel bits | Max. #. Spatial layers | Max. #UL-SCH TB bits/TTI | Max. #UL-SCH bits/TB/TTI | Support for 64 QAM |
| Category 1 | 10/5 | 10296 | 10296 | 250368 | 1 | 5160 | 5160 | No |
| Category 2 | 50/25 | 51024 | 51024 | 1237248 | 2 | 25456 | 25456 | No |
| Category 3 | 100/50 | 102048 | 75376 | 1237248 | 2 | 51024 | 51024 | No |
| Category 4 | 150/50 | 150752 | 75376 | 1827072 | 2 | 51024 | 51024 | No |
| Category 5 | 300/75 | 299552 | 149776 | 3667200 | 4 | 75376 | 75376 | Yes |
| Category 6 | 300/50 | [299552] | [TBD] | [3667200] | — | [51024] | [TBD] | No |
| Category 7 | 300/150 | [299552] | [TBD] | [TBD] | — | [150752/102048 (up to RAN4)] | [TBD] | Yes/No (Up to RAN 4) |
| Category 8 | 1200/600 | [1200000] | [TBD] | [TBD] | — | [600000] | [TBD] | Yes |

Referring to Table 4, a UE category 1 is defined for UEs requiring a low data rate. For instance, UEs belonging to the category 1 do not support MIMO and a buffer size or a memory size in the UEs may be small. Hence, a category 1 UE can be designed by low cost using parts utilizing a simple reception algorithm. On the contrary, a UE category 8 is defined for UEs requiring a high data rate. Hence, UEs belonging to the category 8 can support such a transmission scheme as MIMO and the like. To this end, the UEs need to have a big buffer size or a big memory size. Hence, the UEs belonging to the category 8 require expensive parts.

Recent MTC environment is requiring necessity for small amount of data and/or limited mobility, possibility of reducing cost and complexity and low cost device compared to a UE category. This indicates that implementation of an MTC UE is required by complexity lower than the UE category 1 mentioned earlier in Table 4 and low cost. This sort of requirements is necessary for prompt dissemination of the MTC and efficient management of the MTC.

And, it is preferable to distinguish a radio resource used for the MTC from a radio resource used by a UE and/or a base station of a general cellular system (e.g., LTE/LTE-system). This is intended for interference-free communication between the MTC and the cellular communication. The radio resource used for the MTC and the radio resource used for the cellular communication can be distinguished from each other using time, frequency, space and/or a code.

To this end, the embodiments of the present invention propose a process and signaling methods necessary for distinguishing the radio resource used for the MTC from the radio resource used for the cellular communication in the frequency axis.

And, the embodiments of the present invention can also be utilized as a scheme capable of controlling a ratio of DL/UL without modifying TDD configuration (refer to Table 2 and 3) in TDD (time division duplexing) system.

2.1 Method for Allocating UE-Specific Uplink System Bandwidth in MTC Environment In embodiments of the present invention, a system bandwidth corresponds to a bandwidth for transmitting PUCCH Referring to FIG. 6, a base station and/or an MTC server can transmit a RRC signaling or a MAC signaling including UL system bandwidth indication information to an MTC terminal [S610].

In the step S610, as shown in Table 5 in the following, the UL system bandwidth indication information can be configured by a bitmap form.

TABLE 5

| UL system bandwidth (RB) | Bitmap |
| --- | --- |
| 20 | 0010100 |
| 40 | 0101000 |

Referring to Table 5, it is able to check that the UL system bandwidth indication information represents an absolute value for a UL system bandwidth by a bitmap form. According to current LTE/LTE-A system (Rel-8/9/10/11), a system bandwidth of DL/UL can be configured by 6 RBs (resource blocks) to 110 RBs. In order to indicate the system bandwidth, information of 7 bits is required. In particular, a UE-specific UL bandwidth allocated to an MTC terminal can be indicated using a bitmap of 7 bits in MTC as well.

Or, as a different aspect of the present invention, a different method of configuring the UL system bandwidth indication information is explained in the following. A system bandwidth considered in the MTC corresponds to 6, 15, 25, 50, 75, and 100 RBs. Hence, the UL system bandwidth indication information can be represented by a bitmap form in a manner of considering a bandwidth restricted to the MTC only. Table 6 in the following shows an embodiment of configuring the UL system bandwidth indication information using a bitmap of 3 bits.

TABLE 6

| UL system bandwidth (RB) | Bitmap |
|---|---|
| 6 | 000 |
| 15 | 001 |
| 25 | 010 |
| 50 | 011 |
| 75 | 100 |
| 100 | 101 |
| Reserved | 110 |
| Reserved | 111 |

Or, as a different aspect of the present invention, a further different method of configuring the UL system bandwidth indication information is explained in the following.

The UL system bandwidth indication information can be configured by a value relative to a DL system bandwidth. For instance, since the DL system bandwidth is represented by 6 RBs to 110 RBs in current LTE/LTE-A system, the UL system bandwidth indication information can be represented by a relative difference value for the DL system bandwidth. In this case, the relative difference value can be configured by a bitmap form.

Or, the UL system bandwidth indication information can be configured by a relative difference value between a DL system bandwidth and an UL system bandwidth based on the system bandwidth considered in the MTC including 6, 15, 25, 50, 75, and 100 RBs.

Referring back to FIG. 6, having received the UL system bandwidth indication information via upper layer signaling in the step S610, the terminal can obtain UL system bandwidth information based on the UL system bandwidth indication information [S620].

After then, the terminal can transmit MTC UL control information to the base station and/or the MTC server [S630].

In FIG. 6, a method for allocating an UL system bandwidth has been explained. The method can be identically applied to a method for allocating a DL system bandwidth as well. If a DL system bandwidth for an MTC terminal is allotted, the terminal can receive DL control information via the DL system bandwidth in the step S630.

2.2 Method of Configuring MTC Bandwidth in MTC Environment

If a DL system bandwidth and an UL system bandwidth are differently configured, a legacy UL system bandwidth may be divided and a part of the divided legacy UL system bandwidths may be used as an MTC bandwidth for MTC or a DL system bandwidth.

Figure 7:
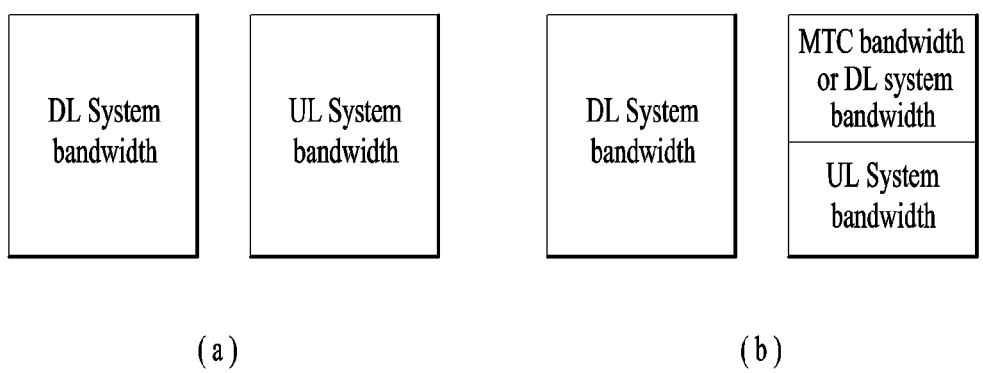
FIG. 7 illustrates an example of an MTC bandwidth configured in MTC.

FIG. 7 illustrates an example of an MTC bandwidth configured in MTC.

FIG. 7 (*a*) shows an example of a legacy DL/UL system bandwidth allocated to a terminal in current LTE/LTE-A system and FIG. 7 (*b*) shows an example of DL/UL system bandwidth configuration configured in MTC. In particular, FIG. 7 (*b*) shows a system configuration that a part of a legacy UL system bandwidth is allocated as an MTC bandwidth or a DL system bandwidth.

FIG. 8 illustrates a different example of an MTC bandwidth configured in MTC.

A base station does not UE-specifically indicate a system bandwidth between a terminal and the base station to the terminal. Instead, the base station can indicate a cell-specific MTC bandwidth for communication between terminals or an additional DL system bandwidth in TDD system.

Referring to FIG. 8, it is able to see that an MTC bandwidth or an additional DL system bandwidth is additionally allocated to a lower part, an upper part or both parts of a legacy UL system bandwidth between a base station and a terminal. In this case, the MTC bandwidth can be added only without an influence on a size of the legacy UL system bandwidth.

FIG. 8 (*a*) shows a configuration of continuously allocating an MTC bandwidth to a lower part of an UL system bandwidth, FIG. 8 (*b*) shows a configuration of continuously allocating the MTC bandwidth to an upper part of the UL system bandwidth and FIG. 8 (*c*) shows a configuration of continuously allocating the MTC bandwidth to both the upper part and the lower part of the UL system bandwidth.

FIG. 9 illustrates a further different example of an MTC bandwidth configured in MTC.

Unlike the MTC bandwidth shown in FIG. 8, the MTC bandwidth can be allocated to a part of a legacy UL system bandwidth. For instance, as shown in FIG. 9(*a*), as the legacy UL system bandwidth is divided, an UL system bandwidth is allocated to an upper part of the legacy UL system bandwidth and an MTC bandwidth or a DL system bandwidth can be allocated to a lower part of the legacy UL system bandwidth. As shown in FIG. 9(*b*), as a legacy UL system bandwidth is divided, an MTC system bandwidth is allocated to an upper part of the legacy UL system bandwidth and an UL system bandwidth can be allocated to a lower part of the legacy UL system bandwidth. As shown in FIG. 9(*c*), as a legacy UL system bandwidth is divided, an MTC system bandwidth or a DL system bandwidth is allocated to an upper part and a lower part of the legacy UL system bandwidth and an UL system bandwidth can be allocated to a middle part of the legacy UL system bandwidth.

As shown in FIG. 9, if DL/UL system bandwidth is configured for an MTC terminal, it may not change a size of a legacy system bandwidth. In this case, a system bandwidth between a base station and a terminal can be configured by a new system bandwidth. The new system bandwidth can be determined by a difference value between the legacy system bandwidth and an MTC bandwidth (new system bandwidth=system bandwidth−MTC bandwidth) and the terminal and the base station can perform communication via the new system bandwidth.

In FIGS. 7 to 10, a method for allocating an MTC bandwidth capable of being used by MTC terminals has been explained. In this case, the MTC bandwidth can include at least one of an uplink system bandwidth and a downlink system bandwidth for the MTC terminals.

3. Apparatuses

Figure 10:
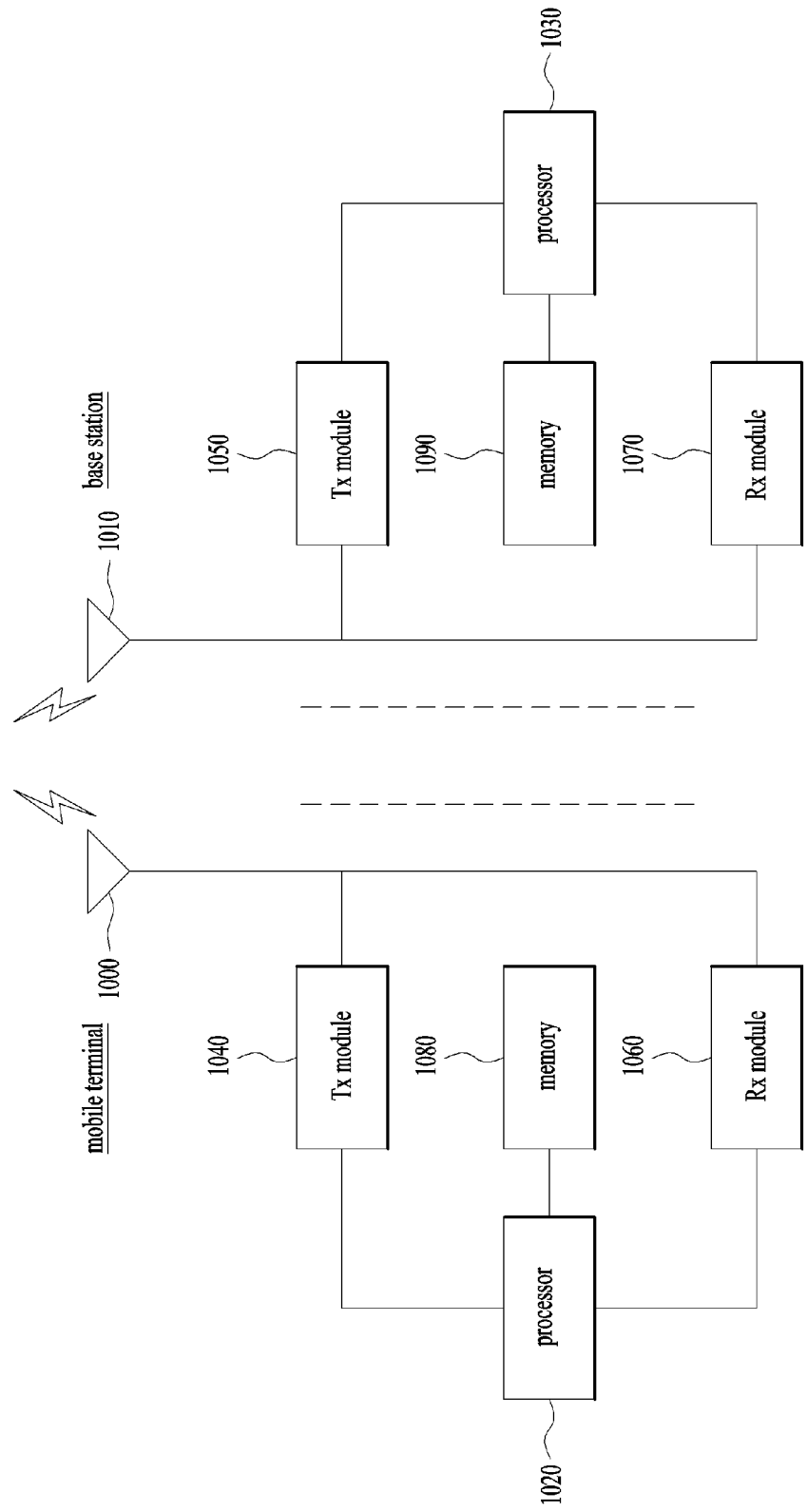
FIG. 10 illustrates a medium capable of implementing contents described in FIG. 1 to FIG. 9.

Apparatuses illustrated in FIG. 10 are means that can implement the methods described before with reference to FIGS. 1 to 9.

A MTC UE may act as a transmitter on a UL and as a receiver on a DL. A BS may act as a receiver on a UL and as a transmitter on a DL.

That is, each of the UE and the BS may include a Transmission (Tx) module 1040 or 1050 and a Reception (Rx) module 1060 or 1070, for controlling transmission and reception of information, data, and/or messages, and an antenna 1000 or 1010 for transmitting and receiving information, data, and/or messages.

Each of the UE and the BS may further include a processor 1020 or 1030 for implementing the afore-described embodiments of the present invention and a memory 1080 or 1090 for temporarily or permanently storing operations of the processor 1020 or 1030.

Embodiments of the present invention can be performed using the aforementioned configuration element and functions of the terminal and the base station. For instance, a processor of an MTC terminal obtains information on an uplink system bandwidth for the MTC terminal in a manner of combining the aforementioned methods disclosed in the first and second section with each other and may be able to transmit control information and/or system information via the corresponding band. And, a processor of the base station allots the system bandwidth mentioned earlier in FIG. 7 to FIG. 9 and may be able to transmit information on the bandwidth to the terminal using the method mentioned earlier in FIG. 8. It may refer to a corresponding drawing for detail contents.

The Tx and Rx modules of the UE and the BS may perform a packet modulation/demodulation function for data transmission, a high-speed packet channel coding function, OFDMA packet scheduling, TDD packet scheduling, and/or channelization. Each of the UE and the BS of FIG. 10 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1080 or 1090 and executed by the processor 1020 or 1030. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

What is claimed is:

1. A method for allocating system bandwidth to a machine type communication (MTC) terminal in a wireless access system supporting MTC, the method comprising:
   receiving, by the MTC terminal, an upper layer signal including system bandwidth indication information indicating an MTC uplink system bandwidth allocated to the MTC terminal; and
   transmitting, by the MTC terminal, uplink control information via the MTC uplink system bandwidth indicated by the system bandwidth indication information,
   wherein the wireless access system supports a time division duplex (TDD) system and the system bandwidth is allocated according to a TDD scheme,
   wherein the system bandwidth indication information is configured by a difference value between a downlink system bandwidth for a long term evolution (LTE) system and the MTC uplink system bandwidth,
   wherein the MTC uplink system bandwidth is allocated within an uplink system bandwidth of the LTE system and a remaining part of the uplink system bandwidth is used for a non-MTC terminal, and
   wherein the MTC uplink system bandwidth is configured in a manner of being adjacent to the remaining part of the uplink system bandwidth so that the remaining part of the uplink system bandwidth exists in between the MTC uplink system bandwidth and another downlink system bandwidth in a frequency axis direction and being adjacent to the downlink system bandwidth for the LTE system in a time axis direction.

2. A method for allocating system bandwidth to a machine type communication MTC terminal in a wireless access system supporting MTC, the method performed by a base station and comprising:
   transmitting an upper layer signal including system bandwidth indication information indicating an MTC uplink system bandwidth allocated to the MTC terminal; and
   receiving uplink control information via the MTC uplink system bandwidth indicated by the system bandwidth indication information,
   wherein the wireless access system supports a time division duplex (TDD) system and the system bandwidth is allocated according to a TDD scheme,
   wherein the system bandwidth indication information is configured based on a difference value between a downlink system bandwidth for a long term evolution (LTE) system and the MTC uplink system bandwidth,
   wherein the MTC uplink system bandwidth is allocated within an uplink system bandwidth of the LTE system and a remaining part of the uplink system bandwidth is used for a non-MTC terminal, and
   wherein the MTC uplink system bandwidth is configured in a manner of being adjacent to the remaining part of the uplink system bandwidth so that the remaining part of the uplink system bandwidth exists in between the MTC uplink system bandwidth and another downlink system bandwidth in a frequency axis direction and being adjacent to the downlink system bandwidth for the LTE system in a time axis direction.

3. A machine type communication (MTC) terminal to which a system bandwidth is allocated in a wireless access system supporting MTC, the MTC terminal comprising:
a transmitter;
a receiver; and
a processor, operatively coupled to the transmitter and the receiver, wherein the processor is configured to:
control the receiver to receive an upper layer signal including system bandwidth indication information indicating an MTC uplink system bandwidth allocated to the MTC terminal; and
control the transmitter to transmit uplink control information via the MTC uplink system bandwidth indicated by the system bandwidth indication information,
wherein the wireless access system supports a time division duplex (TDD) system and the system bandwidth is allocated according to a TDD scheme,
wherein the system bandwidth indication information is configured by a difference value between a downlink system bandwidth for a long term evolution (LTE) system and the MTC uplink system bandwidth,
wherein the MTC uplink system bandwidth is allocated within an uplink system bandwidth of the LTE system and a remaining part of the uplink system bandwidth is used for a non-MTC terminal, and
wherein the MTC uplink system bandwidth is configured in a manner of being adjacent to the remaining part of the uplink system bandwidth so that the remaining part of the uplink system bandwidth exists in between the MTC uplink system bandwidth and another downlink system bandwidth in a frequency axis direction and being adjacent to the downlink system bandwidth for the LTE system in a time axis direction.

4. A base station configured to allocate system bandwidth to a machine type communication (MTC) terminal in a wireless access system supporting MTC, the base station comprising:
a transmitter;
a receiver; and
a processor, operatively coupled to the transmitter and the receiver, wherein the processor is configured to:
control the transmitter to transmit an upper layer signal including system bandwidth indication information indicating an MTC uplink system bandwidth allocated to the MTC terminal; and
control the receiver to receive uplink control information via the MTC uplink system bandwidth indicated by the system bandwidth indication information,
wherein the wireless access system supports a time division duplex (TDD) system and the system bandwidth is allocated according to a TDD scheme,
wherein the system bandwidth indication information is configured by a difference value between a downlink system bandwidth for a long term evolution (LTE) system and the MTC uplink system bandwidth,
wherein the MTC uplink system bandwidth is allocated within an uplink system bandwidth of the LTE system and a remaining part of the uplink system bandwidth is used for a non-MTC terminal, and
wherein the MTC uplink system bandwidth is configured in a manner of being adjacent to the remaining part of the uplink system bandwidth so that the remaining part of the uplink system bandwidth exists in between the MTC uplink system bandwidth and another downlink system bandwidth in a frequency axis direction and being adjacent to the downlink system bandwidth for the LTE system in a time axis direction.

* * * * *